Dec. 13, 1966  U. TSAO  3,290,894
COOLING SYSTEM FOR REACTOR
Filed Jan. 21, 1965
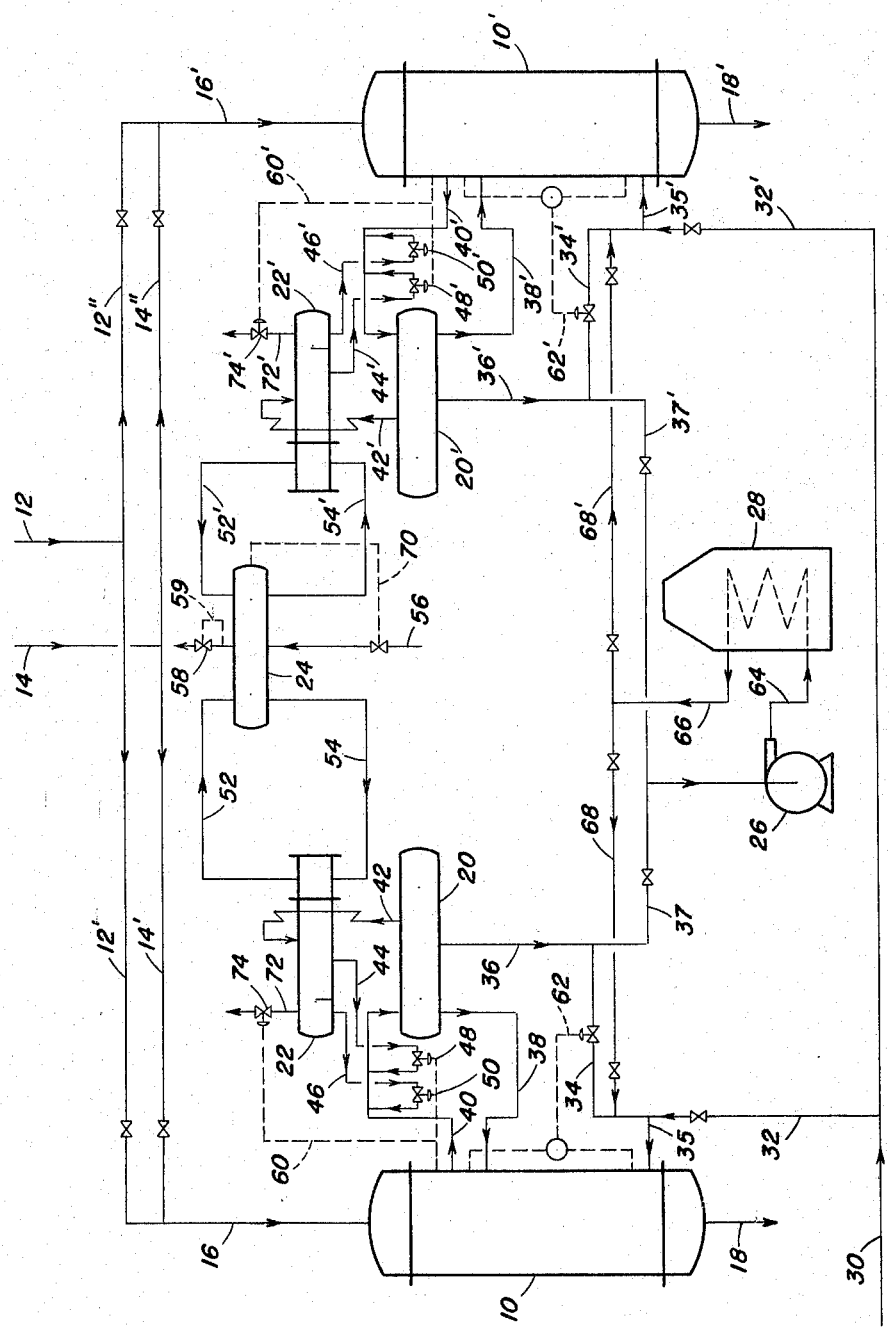
INVENTOR
Utah Tsao
BY
Flynn, Marn & Jangarathis
ATTORNEY

United States Patent Office 3,290,894
Patented Dec. 13, 1966

3,290,894
COOLING SYSTEM FOR REACTOR
Utah Tsao, Jersey City, N.J., assignor to The Lummus Company, New York, N.Y., a corporation of Delaware
Filed Jan. 21, 1965, Ser. No. 426,752
8 Claims. (Cl. 62—216)

This invention relates, in general, to cooling systems, and more particularly, to cooling systems for a plurality of reactors where, under certain conditions, a substantial increase in the flow of reactants to a single reactor can occur. The invention finds application in the chemical process industries, for example, in the catalytic oxidation of olefins.

For purposes of illustration, the invention will be discussed in its application to the production of ethylene oxide, it being understood that it is not limited to this application.

The oxidation of ethylene to ethylene oxide is generally accomplished by reaction with air or oxygen in the presence of a silver catalyst mounted on a suitable carrier, with the optional addition of small amounts of certain chlorinated hydrocarbons which serve to activate the catalyst. Under normal operating conditions, the oxidation reaction produces mostly ethylene oxide, with $CO_2$ and $H_2O$ as side products. This is an exothermic reaction, but not one which calls for anything more than conventional cooling means. The construction of the reactor is similar to a vertical shell and tube heat exchanger. The tubes are filled with the above-mentioned catalyst. The shell side of the reactor is provided with an organic coolant, selected on the basis of having its boiling point coincide, approximately with the reaction temperature. Suitable pumps, heat exchangers and condensers are employed to condense and recirculate the coolant.

Without careful temperature control, however, the oxidation reaction can proceed to the formation of carbon dioxide and water vapor. This not only reduces the yield but is a much more exothermic reaction which will cause "hot spots" within the reactor and a consequent increase in the demands made upon the cooling system. Of course, such "hot spots" increase local temperatures and tend to spread rapidly throughout the reactor, causing what is called a runaway condition. Where a single cooling system is employed for a number of reactors, a runaway condition in one reactor will reduce the efficiency of the entire cooling system, and a runaway condition in one reactor will tend to spread to others.

A further and even more extreme load can be placed on the cooling system of such a reactor when, as is the case in many integrated chemical plants, a plurality of reactors are employed in parallel, one or more are temporarily out of service, and a control failure occurs and the reactants intended for all reactors are fed instead to a lesser number. Lastly, if this condition exists together with a runaway condition, the situation may become explosively dangerous.

For example, the normal heat evolution for an ethylene oxide reactor may be about 29 million B.t.u./hr., including both feed gas temperature and heat release during oxidation. If a single oxygen plant is supplying two such reactors and both are operating normally, total cooling load is about 58 million B.t.u./hr. If one reactor is under a runaway condition, the load on its cooling system will rise to about 41 million B.t.u./hr., just on the basis of heat release from $CO_2$ and $H_2O$ formation.

If the second reactor were not operating, a control failure occurred and the operating reactor received the ethylene and oxygen normally fed to both, the cooling load would rise to 58 million B.t.u./hr. if the reactor was under control, and to 70+ million B.t.u./hr., if it was running out of control.

It is therefore an object of the present invention to provide a cooling system for process reactors which overcome the foregoing deficiencies and hazards.

A further object of the invention is the provision of a reactor cooling system which has sufficient capacity to function under any conceivable load but is still efficient at normal cooling loads.

A still further object of the invention is the provision of a reactor cooling system which is both simpler and safer to operate than prior art systems.

Yet another object of the invention is to provide a cooling system for a plurality of reactors where runaway in one reactor will not cause or tend to cause runaway in other reactors.

Still another object of the invention is the provision of a reactor cooling system capable of operating under any conceivable load and which is more economic to construct and to operate than prior art systems.

Other objects and advantages of the invention will appear from the following description of an embodiment thereof, and the novel features will be particularly pointed out in connection with the appended claims.

A feature of the present invention is a surge drum for receiving condensed coolant gases from a condenser and vapors directly from the reactor in a single line, direct heat exchange within the line and drum tending to cool the effluent gases and maintain the liquid coolant at its boiling temperature. The condenser has sufficient capacity to handle the largest conceivable cooling load, and is also provided with baffles so that it operates efficiently at the normal load without under-cooling the coolant. Under normal operation, coolant gases pass from the reactor to the surge drum, from there to the condenser, circulate through a part thereof only and thence back to the effluent gas stream and the surge tank. Liquid coolant flows from the surge tank back into the reactor. If pressure in the cooling side rises, indicating a runaway condition, a second reflux line is opened and the entire condenser is utilized for condensing the hotter, higher-pressure gases.

Steam is employed in the condenser, one steam drum being suitable to supply two or more cooling systems. This is, however, the only real link between the cooling systems; in this manner, there is no chance that an increased load on one system will reduce the efficiency of others, thus tending to cause a chain reaction.

A circulation pump and heater are generally provided, but are used only in starting up the reactors, no pumps being required during operation.

A better understanding of the system of the invention will be gained by referring to the following detailed description thereof, taken in conjunction with the single accompanying drawing, which is a flow sheet or flow diagram illustrating an embodiment of the invention as employed in an ethylene oxide plant.

In the drawing, it will be seen that the cooling system of the invention contains parallel process units, and like parts are indicated by prime reference numerals for ease of understanding.

With reference to the drawing, catalyst-filled reactors 10, 10' are fed ethylene from lines 12, 12' and 12" and oxygen from lines 14, 14' and 14". Effluent reaction products are withdrawn from reactors 10, 10' through lines 18, 18' and passed on for further processing.

For purposes of simplicity, the cooling system for reactor 10 only will be described (left side of the drawing).

At start-up, coolant is passed from coolant surge drum 20 through lines 36 and 37, to start-up circulation pump 26, through lines 64 and 66, to and from start-up heater 28, and through lines 68 and 35 into reactor 10. After start-up, pump 26 and heater 28 are not needed, valves in lines 37 and 68 are closed, and coolant flows directly from line 36 into lines 34 and 35 and into reactor 10, the valve in line 34 in this case being opened.

At any time required, make-up coolant can be fed from storage into the system from lines 30 and 32. During operation, control system 62 maintains the proper coolant pressure within reactor 10 by controlling the valves in line 34.

The coolant vaporizes in reactor 10 and passes out through line 40 into coolant surge drum 20. Gaseous coolant in surge drum 20 is passed through line 42 into coolant condenser 22. Condensed coolant normally passes through line 46, valve 50 and line 40 back into coolant surge drum 22, where it returns to reactor 10 through lines 36 and 38.

Noncondensable vapors in condenser 22 are vented through line 72 when valve 74 is open. Valve 74, together with valves 48 and 50, are controlled by pressure control circuit 60; valve 48 is normally closed, and valve 74 opens only when valve 50 is fully open. Thus, in the event of a runaway condition when the full capacity of condenser 22 is required, valves 48, 50 and 74 would all be open and condensate would return to line 40 through both lines 44 and 46.

The surface area of the condenser required to condense the coolant vapor from the reactor is controlled by maintaining in the condenser a certain liquid level which is in turn controlled by valve 50 in line 46 under ordinary conditions. The non-condensables accumulated in the condenser will reduce the condensing efficiency of the condensing area and thus it causes valve 50 to open to lower the liquid level in the condenser in order to expose more condensing area. The noncondensables accumulated in the condenser can be intermittently vented through valve 74. However, if the venting of the noncondensable is neglected, then when the valve 50 reaches a wide open position, the vent 74 will be opened automatically. Valve 48 is opened only under extraordinary conditions, when the full condensing capacity is required.

Condenser 22 is supplied with water through line 54 which is recycled back to steam drum 24 through line 52. Operation of steam drum 24 is controlled by venting steam through line 58 if pressure, as determined by pressure control circuit 59, rises too high. Feed water is supplied through line 56 when level control circuit 70 indicates a need therefor.

Under normal operation, with reactors 10 and 10' both running, the maximum cooling load for a 60 million lb./yr. ethylene oxide plant operating with feed gas at 400° F. will be approximately 70 million B.t.u./hr. (calculated on the basis of 165 tons per day of oxygen). Under average conditions, the cooling load will be only 57.6 million B.t.u./hr., with each cooling system absorbing 28.8 million B.t.u./hr.

If reactor 10' is operating normally, and reactor 10 is in a runaway condition, the cooling system of reactor 10 will have to absorb a maximum of 41.2 million B.t.u./hr. (70–28.8) on the basis of oxygen availability. Under such conditions, the maximum pressure in the shell of reactor 10 will be only 24 p.s.i.g., and the temperature will increase only 12°F. for a condenser having 4000 square feet of cooling surface.

The worst possible combination of circumstances involves the situation where reactor 10' is down (valves in line 12" and 14" are closed), reactor 10 is under a runaway condition, and valves in line 12' and 14' fail in the wide open position. In this unlikely circumstance, the cooling load on the single reactor cooling system is the maximum 70 million B.t.u./hr. Even under such conditions, the aforementioned 4000 square foot condenser affords sufficient capacity so that maximum pressure will be only 60 p.s.i.g., at the top of the reactor and temperature rise will be about 65°F. Reactor 10 should have a maximum design pressure of at least 75 p.s.i.g., but this is not difficult or costly to obtain, and most such reactors in current use will withstand this pressure.

Under normal operating conditions, gaseous coolant in line 42 is at 18 p.s.i.g. and 479°F., and condenser 22 has approximately 27% excess cooling capacity which may be baffled off to reduce under-cooling. Under the extreme conditions noted above, vapors in line 42 are at 55–60 p.s.i.g. and 544°F. Cooling water in line 54 is normally provided at 382°F. and 185 p.s.i.g. The increase in the duty of the condenser is taken care of by the increase in the temperature of the hot medium.

While the foregoing description and data have been used to describe and illustrate an embodiment of the invention, various changes in the steps, materials and arrangements of parts may be made by those skilled in the art without departing from the scope of the invention as defined in the appended claims.

What is claimed is:
1. Cooling system for reactor tubes that comprises,
shell means surrounding said reactor tubes;
inlet means for supplying liquid coolant to said shell and outlet means for withdrawing vaporized coolant from said shell;
condenser means for receiving said vaporized coolant, said condenser means including a first portion having sufficient cooling surface to condense gases at normal operating temperature and pressure and a second portion having sufficient cooling surface to condense gases of extraordinary temperature and pressure;
conduit means for withdrawing liquid coolant from said condenser means;
surge drum means for receiving liquid coolant from said condenser and conduit means and vaporized coolant from said outlet means, and allowing direct heat exchange therebetween;
means for supplying said vaporized coolant to said condenser means from said surge drum means; and
means for supplying liquid coolant to said inlet means from said surge drum means.

2. The cooling system as claimed in claim 1, wherein said conduit means comprise first conduit and valve means operable to control the flow of liquid coolant from said condenser means to said surge drum means under ordinary operating conditions;
second conduit and valve means operable to control the flow of liquid coolant from said condenser means to said surge drum means under extraordinary operating conditions; and
first control means responsive to temperature and pressure of effluent coolant gases and controlling said first and second valve means.

3. The cooling system as claimed in claim 1, and additionally comprising heat exchanger means supplying a heat exchange fluid to said condenser means.

4. The cooling system as claimed in claim 2, and further comprising;
third valve means for venting non-condensible gases from said condenser means; and
control means capable of opening said third valve means when said first valve means is completely open.

5. Cooling system for reactor tubes that comprises,
shell means surrounding said reactor tubes;
inlet means for supplying liquid coolant to said shell and outlet means for withdrawing vaporized coolant from said shell;
condenser means for receiving said vaporized coolant, said condenser means including a first portion having sufficient cooling surface to condense gases at normal operating temperature and pressure and a second portion having sufficient cooling surface to condense gases of extraordinary temperature and pressure;

conduit means for withdrawing liquid coolant from said condenser means;

surge drum means for receiving liquid coolant from said condenser and conduit means and vaporized coolant from said outlet means, and allowing direct heat exchange therebetween;

means for supplying said vaporized coolant to said condenser means from said surge drum means;

means for supplying liquid coolant to said inlet means from said surge drum means;

conduit means for withdrawing liquid coolant from said condenser means and supplying the same to said surge drum means, said conduit means comprising a first conduit and valve connected to the first portion of said condenser and a second conduit and valve connected to the second portion of said condenser;

first control means responsive to temperature and pressure of said vaporized coolant and controlling said first valve to provide normal flow of liquid coolant from said condenser to said surge drum under normal conditions of operation and controlling said second valve to provide increased flow of liquid coolant from said condenser to said surge drum under extraordinary conditions of operation; and a third valve for periodically venting non-condensible gases from said condenser means.

6. The cooling system as claimed in claim 5, and additionally comprising
second control means for automatically opening said third valve when said first valve is completely open.

7. The cooling system as claimed in claim 5, wherein said conduit means supply liquid coolant from said condenser means directly to said outlet means supplying vaporized coolant to said surge drum means, whereby heat exchange between said liquid and vaporized coolants is increased.

8. The cooling system as claimed in claim 5, and additionally comprising heat exchanger means supplying a heat exchange fluid to a plurality of said condenser means, each of said condenser means being associated with a single shell means.

References Cited by the Applicant

UNITED STATES PATENTS

| | | |
|---|---|---|
| 2,519,481 | 8/1950 | Kubie. |
| 2,788,264 | 4/1957 | Bremer _____ 23—1 X |
| 2,845,472 | 7/1958 | Narbut. |

MEYER PERLIN, *Primary Examiner.*